ary Examiner—E. A. Goldberg
United States Patent [19]
Imamura et al.

[11] 3,745,431
[45] July 10, 1973

[54] HIGH VOLTAGE CAPACITOR ASSEMBLY

[75] Inventors: Eiji Imamura; Hajime Arakawa, both of Otokuni-gun, Kyoto-fu, Japan

[73] Assignee: Murata Manufacturing Co., Ltd., Kyoto-fu, Japan

[22] Filed: Mar. 2, 1972

[21] Appl. No.: 231,183

[30] Foreign Application Priority Data
Mar. 2, 1971 Japan..........................46/13180
Mar. 2, 1971 Japan..........................46/13181

[52] U.S. Cl................. 317/258, 29/25.42, 317/261
[51] Int. Cl................................................ H01g 1/13
[58] Field of Search.................... 317/261, 258, 242; 29/25.42

[56] References Cited
UNITED STATES PATENTS

| | | | |
|---|---|---|---|
| 1,713,867 | 5/1929 | Dublier | 317/261 |
| 2,569,655 | 10/1951 | Cage | 317/242 |
| 2,717,946 | 9/1955 | Peck | 317/258 X |
| 2,972,570 | 2/1961 | Haas | 317/258 X |
| 3,004,197 | 10/1961 | Rodriguez | 317/258 |
| 3,086,150 | 4/1963 | Held | 317/261 X |
| 3,195,027 | 7/1965 | Vandermark | 317/261 X |
| 3,496,434 | 2/1970 | Prokopowicz | 317/261 X |

FOREIGN PATENTS OR APPLICATIONS 601,109 4/1948 Great Britain..................... 317/258

Primary Examiner—E. A. Goldberg
Attorney—Paul M. Craig, Jr., Donald R. Antonelli, David T. Terry and Charles E. Wands

[57] ABSTRACT

A high voltage capacitor assembly includes a ceramic body formed with a plurality of ceramic elements and embedded with interior electrodes which act to reduce the uneven potential distribution, which is often concentrated around the periphery of each of the exterior electrodes provided on both end faces of the ceramic body, thereby providing a capacitor assembly with an improved breakdown voltage characteristic.

23 Claims, 9 Drawing Figures

HIGH VOLTAGE CAPACITOR ASSEMBLY

The present invention relates to an improved high voltage capacitor assembly and, more particularly, to an improved laminated capacitor assembly of compact size having a high breakdown voltage characteristic, and to a method of manufacturing the same.

It has been well known that a ceramic capacitor of simple construction, such as one comprising a dielectric or ceramic element having a pair of opposed faces provided with respective electrodes, has a tendency to be subject to an electric discharge between the electrodes with eventual deterioration of the breakdown voltage characteristic, in view of the fact that when a relatively high voltage is applied to such a ceramic capacitor, the potential distribution, i.e., the electric field, becomes uneven around the periphery of each of the electrodes on the opposed faces of the ceramic element.

To eliminate the above-mentioned drawback, various types of capacitors of similar character have heretofore been proposed. Of these, one proposed capacitor includes a Rogowski electrode provided on the opposed faces of the ceramic element for improving the potential distribution around the periphery of each of the electrodes. In this proposed capacitor however, even though the potential distribution can be more or less improved, manufacture thereof is very complicated in view of the particular shape of the Rogowski electrode and, hence, mass-production of the capacitor having Rogowski electrodes is often hampered.

Another proposed capacitor is so formed that the periphery of each of the electrodes is of planar shape on the opposed faces of the ceramic element and is covered with a shaped insulator made of synthetic resin and bonded to the periphery of the corresponding faces of the ceramic element with the use of a bonding agent, to achieve the same purpose. However, in view of the fact that the dielectric constant of any one of the synthetic resins, including the bonding agent used, which are heretofore commercially available, is of a relatively small value as compared with that of a ceramic material, as far as material for capacitors is concerned, the performance of this type of capacitor is not satisfactory.

In addition thereto, in view of the characteristic $V = A \cdot d^n$, wherein $V$ represents the dielectric breakdown voltage, $d$ represents the thickness of the ceramic element used, $A$ represents a constant dependent upon the kind of the ceramic element used and particulars of the dielectric strength test conducted, and $n$ represents the number of the ceramic element used, a laminated capacitor assembly has also been proposed comprising a pair of exterior electrodes provided on both end faces of the capacitor assembly, a plurality of ceramic elements, at least one interior electrode sandwiched between the adjacent ceramic elements and an insulating material coated or plated on the outer peripheral surface of the capacitor assembly, whereby the voltage applied between the exterior electrodes is divided by the presence of the interior electrode.

However, even in this proposed laminated capacitor assembly, the electric field has a tendency to be intensified around the periphery of each of the exterior and interior electrodes, because of the periphery of the interior electrode sandwiched between the adjacent ceramic elements is located in the same plane as the peripheral surface of the capacitor assembly and, hence, is accessible through the coated or bonded insulating material to air which generally has a dielectric constant smaller than that of any of the ceramic elements and insulating material. Therefore, the breakdown voltage characteristic of this laminated capacitor assembly remains substantially unimproved. Moreover, the size of the capacitor assembly is so bulky that structural simplification of a device in which it is employed or to be employed cannot be expected.

Accordingly, an essential object of the present invention is to provide an improved laminated capacitor assembly of compact size having a high breakdown voltage characteristic with substantial elimination of the disadvantages inherent in the conventional capacitor of a similar character.

Another object of the present invention is to provide an improved laminated capacitor assembly wherein provision is made to ensure reduction or substantial elimination of electric stress concentration occurring around the outermost periphery of each of the electrodes employed.

A further object of the present invention is to provide an improved laminated capacitor assembly wherein at least one interior electrode is sandwiched between the adjacent ceramic elements in an embedded fashion so that the breakdown voltage characteristic is improved substantially by a factor of two more than that of a conventional capacitor assembly of a similar character.

It is a related object of the present invention to provide a method of manufacturing an improved laminated capacitor assembly of the above referred type without increasing the cost of manufacture thereof.

It is another related object of the present invention to provide a method of manufacturing an improved laminated capacitor assembly of the above referred type mass-production of which can be advantageously facilitated.

According to the present invention, there is provided a laminated capacitor assembly including a plurality of interior electrodes rigidly embedded in the capacitor assembly in parallel relation with respect to a pair of exterior electrodes. In other words, the interior electrodes parallelly spaced with respect to each other and also with respect to the pair of the exterior electrodes are rigidly embedded in the body of ceramic elements of the same or dissimilar quality, thereby permitting the laminated capacitor assembly of the present invention to function in substantially the same manner as afforded by a plurality of series connected capacitors. With the provision of these interior electrodes thus arranged as hereinbefore described, a high voltage applied to the laminated capacitor assembly of the present invention can be advantageously divided thereby in accordance with the static capacitance of each of the series connected capacitors and, concurrently, the unevenness of potential distribution appearing around and in the proximity of the periphery of each of the exterior electrodes provided on both end faces of the body of the ceramic elements of the capacitor assembly can be advantageously reduced in such a way as to permit each of the interior electrodes to participate in the unevenness of such potential distribution, whereby, as a result thereof, the breakdown voltage characteristic of the capacitor assembly of the present invention can be advantageously improved.

These and other objects and features of the present invention will be clearly understood from the following description taken in conjunction with preferred embodiments of the present invention with reference to the accompanying drawings, in which.

Before the description proceeeds, it is to be noted that like parts are designated by like reference numerals throughout the several views of the accompanying drawings for the sake of brevity.

Figure 1:
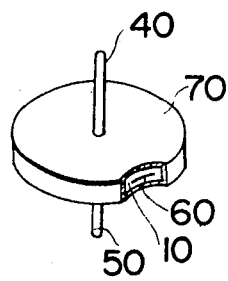
FIG. 1 is a schematic perspective view of a laminated capacitor assembly, with a portion being broken away, constructed in accordance with the present inventon.
Figure 2:
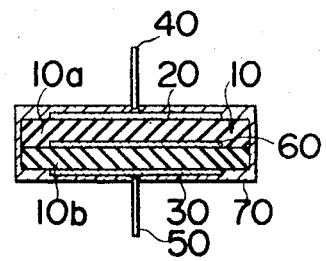
FIG. 2 is a longitudinal cross-section of one embodiment of the laminated capacitor assembly of the present invention.

Referring first to FIG. 1 and 2, a laminated capacitor assembly constructed in accordance with the teachings of the present invention is shown as comprising a body of ceramic material such as selected from a group of either $BaTiO_3$ or $TiO_2$ compounds, a generally indicated by 10, a pair of exterior electrodes 20 and 30 coated on the opposed end faces of the ceramic body 10, each of the exterior electrodes 20 and 30 having a lead wire 40 and 50, respectively, soldered thereto and extending therefrom to the outside, for the purpose of connection with an exterior circuit (not shown), and an interior electrode 60 embedded in ceramic body 10 in a manner as hereinafter described.

The ceramic body 10 includes a pair of ceramic elements 10a and 10b preferably of the same thickness, between which the interior electrode 60 is disposed in equal and parallel spaced relationship with respect to the exterior electrodes 20 and 30 without locating the outermost periphery of the interior electrode 60 in the same plane as the peripheral surface of the ceramic body 10.

It is to be noted that, in a finished state of the capacitor assembly of the present invention, a non-conductive material such as enamel is applied to the whole surface of the ceramic body 10, including the exterior electrodes 20 and 30, to form thereon an insulator covering 70 as clearly illustrated in FIG. 1 with the lead wire 40 and 50 extending through the insulator covering 70.

In manufacturing the ceramic body 10 with the interior electrode 60 embedded therein, a foil of electrode material is applied on one surface of either of the ceramic elements 10a and 10b which, in turn, contact with each other while the foil of electrode material, which represents the interior electrode 60, is sandwiched therebetween. In fact, there will be a gap of space substantially equal to the thickness of the interior electrode 60 in the proximity of the electrode 60 and between the ceramic elements 10a and 10b. However, this gap can be substantially removed when the ceramic body 10 is fired or burned at a suitable temperature and, preferably, at a temperature lower than the lowest melting point of those of the materials used.

Subsequently, the fired ceramic body 60 with the interior electrode 60 embedded therein is coated on both its end faces with the pair of the exterior electrodes 20 and 30 and then subjected to a secondary firing process at a suitable temperature after having been cooled. The lead wires 40 and 50 are thereafter soldered to the exterior electrodes 20 and 30, respectively, and the ceramic body 10 provided with the electrodes 20, 30 and 60 is finally painted with the non-conductive material to form the insulator covering 70.

In the laminated capacitor assembly herein above described, because of one of the most important features of the present invention residing in that the interior electrode 60 is embedded in the ceramic body 10 without its periphery exposed to the outside of said ceramic body 10, thereby permitting the interior electrode 60 to divide a high voltage that has been applied to the capacitor assembly, the oftentimes concentrated potential distribution around and in the proximity of the periphery of each of the exterior electrodes can be advantageously reduced. In addition thereto, by the same reason, the concentrated potential distribution, which may appear around and in the proximity of the interior electrode if the latter is exposed to the outside of the ceramic body such as in the case of the conventional capacitor assembly of a similar character, can be advantageously reduced or substantially eliminated with improvement in the breakdown voltage characteristic. In other words, in view of the fact that the interior electrode is embedded in the ceramic body as hereinbefore described, the interior electrode is substantially shielded by a dielectric of a relatively high dielectric constant, thereby ensuring the reduction of the uneven potential distribution appearing around the periphery of the interior electrode 60, whereby the breakdown voltage characteristic can be improved without an accompanying concentration of the uneven potential distribution around the periphery of each of the exterior electrodes.

It is to be noted that the number of interior electrodes 60 is not limited to one, but three electrodes may be preferably provided. In this case, the ceramic body 10 must include four ceramic elements, since a series of experiments show that the optimum breakdown voltage characteristic of the laminated capacitor assembly of the present invention remains substantially at the same level even if more than three interior electrodes is employed.

While material for the exterior electrodes 20 and 30 may be of any known kind such as silver or its alloys, material for the interior electrode 60 is preferably selected from palladium, platinum and/or a mixture generally used as a material for thermistors, varistors and ferrites. Especially, platinum is preferred because the firing temperature of the platinum is substantially equal to the firing temperature of the ceramic body 10 so that, during the first firing process, either platinum or ceramic material can be integrated with the other. However, if the cost is involved, a known mixture used as a material for thermistors, varistors and ferrites which is inexpensive may be employed without any reduction of the performance of the capacitor assembly of the present invention.

Figure 3:
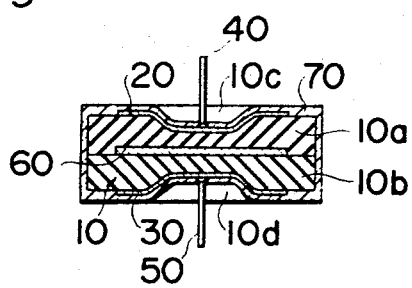
FIG. 3 is a longitudinal cross-section of another embodiment of the laminated capacitor assembly of the present invention.

In the second embodiment of the present invention shown in FIG. 3, the ceramic body 10 has both its end faces recessed in opposed directions to provide respective recesses 10c and 10d and, hence, the exterior electrodes 20 and 30 are also recessed to fit to the recessed end faces of the ceramic body 10, respectively.

In this second embodiment, in addition to the various features as hereinbefore described in connection with the foregoing embodiment shown in FIG. 2, an additional feature can be appreciated, i.e., since the provision of the recesses 10c and 10d on the both end faces of the ceramic body 10 represents a pair of corona rings, the function of which is well known to those skilled in the art, provided on both end faces of the capacitor assembly, prevention of the corona discharge is ensured from occurring on either opposed end of the ceramic capacitor assembly. In other words, even if the corona discharge takes place between the exterior electrodes 20 and 30 when a relatively high voltage has been applied therebetween, this corona discharge can be advantageously prevented because of the exterior electrodes 20 and 30 each functioning in a manner similar to the corona ring.

When manufacturing the laminated capacitor assembly in accordance with the second embodiment of the present invention, the same method as in the foregoing embodiment is applicable. However, to provide the recesses 10c and 10d, the ceramic elements 10a and 10b may be recesses to represent the shape of the rounded recesses 10c and 10d, respectively, before they are subjected to the first firing process. Alternatively, without providing recesses in the ceramic elements 10a and 10b in the manner as hereinbefore described, a pair of ring-shaped ceramic elements of the same quality as that of the ceramic elements 10a and 10b may be mounted on the ceramic body 10 before the first firing process is applied thereto.

A series of experiments showed a substantial improvement in the dielectric breakdown voltage characteristic as set forth in the following table.

| | Breakdown Voltage |
|---|---|
| First Embodiment having six interior electrodes embedded | 36.5 KV DC |
| Second Embodiment | 35.8 KV DC |
| Conventional Sample with no interior electrodes embedded | 12.5 KV DC |
| Conventional Sample having the periphery of each of the exterior electrodes coated with enamel painting agent | 13.3 KV DC |

From the foregoing table, it is clear that the laminated capacitor assembly of the present invention in either of the first and second embodiments has a breakdown voltage higher than twice of that of either of the conventional capacitor assemblies.

It has been well known that the capacitance of a series capacitor is inversely proportional to the voltage impressed thereon, and vice versa. Accordingly, the third embodiment of the present invention shown in FIG. 4(a) has been developed on the basis of this characteristic.

Figure 4A:
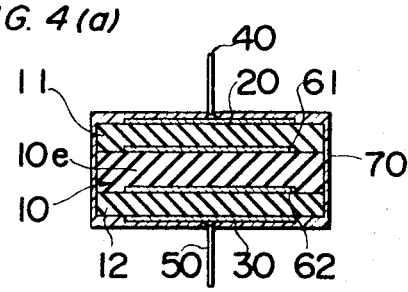
FIG. 4(a) is a longitudinal cross-section of a further embodiment of the laminated capacitor assembly of the present invention.
Figure 4B:
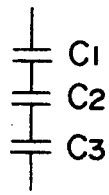
FIG. 4(b) is a schematic diagram showing an equivalent circuit of the laminated capacitor assembly shown in FIG. 4(a)

Referring now to FIG. 4(a) and its equivalent circuit shown in FIG. 4(b), the ceramic body 10 includes at least one ceramic element 10e, a pair of ceramic elements 11 and 12 of a dielectric constant higher than that of ceramic element 10e and a pair of interior electrodes 61 and 62 sandwiched, in the same manner as in the foregoing embodiments, between the ceramic element 10e and each of the ceramic elements 11 and 12. The exterior electrodes 20 and 30 having the respective lead wires 40 and 50 are nevertheless provided on both end faces of the ceramic body 10, i.e., the upper surface of the element 11 and the lower surface of the element 12.

In this arrangement, the laminated capacitor assembly is such that the series capacitance within the interior of the capacitor assembly is of a relatively small value and voltage impressed on the interior electrodes 61 and 62 is increased while that on the exterior electrodes 20 and 30 is reduced to a value as small as possible, whereby concentration of the potential distribution in the proximity of the periphery of each of the exterior electrodes 20 and 30 which is susceptible to the dielectric breakdown can be advantageously reduced.

Turning our attention now to FIG. 4(b) in which the equivalent circuit of the embodiment of FIG. 4(a) is shown, the capacitor assembly is such that, in view of the fact that the ceramic elements 11 and 12 having a dielectric constant higher than that of the ceramic element 10e are respectively disposed between the element 10e and each of the exterior electrodes 20 and 30, the capacitance of each of capacitors $C_1$ and $C_3$ is greater than that of the other capacitor $C_2$.

In the arrangement as hereinbefore described, if a high voltage is applied between the exterior electrodes 20 and 30, the high voltage thus impressed can be divided by the interior electrodes 61 and 62 in the same way as in the foregoing embodiments. However, in addition thereto, since the capacitance of each of the capacitors $C_1$ and $C_3$ is greater than the capacitor $C_2$, by the capacitance sharing effect of the series connected capacitors $C_1$ through $C_3$, the impressed high voltage can be distributed more to the capacitor $C_2$ than to the capacitors $C_1$ and $C_3$, so that no substantial excessive voltage is applied between the exterior electrodes 20 and 30 where the potential gradient can be easily concentrated. In other words, even through a relatively higher voltage is applied to the interior electrodes, by the reason that the interior electrodes are embedded in the ceramic body in such a fashion as to be respectively shielded by the ceramic elements of a higher dielectric constant, the uneven potential distribution appearing in the proximity of the periphery of each of the exterior electrodes can be advantageously reduced with substantial improvement in the breakdown voltage characteristic.

The following table shows the results of experiments conducted in connection with the breakdown voltage characteristic of respective samples:

| | Breakdown Voltage |
|---|---|
| Embodiment of FIG. 4 having three interior electrodes embedded, wherein the ceramic elements 11 and 12 have a dielectric constant of 1650 while the ceramic element 10e has a dielectric constant of 1600. | *31.0 KV DC |

| | Breakdown Voltage |
|---|---|
| Embodiment of FIG. 4 having three interior electrodes embedded, wherein the ceramic elements 11 and 12 have a dielectric constant of 2000 while the ceramic element 102 has a dielectric constant of 1600. | *35.8 KV DC |

In the above Table, the mark (*) indicates an average value with respect to 20 samples tested.

Figure 5:
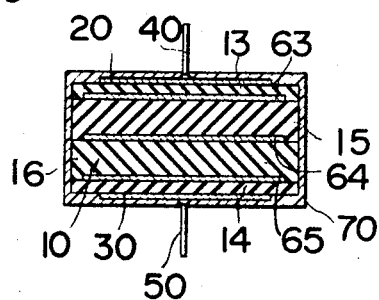
FIG. 5 is a longitudinal cross-section of a still further embodiment of the laminated capacitor assembly of the present invention.

Referring to FIG. 5 wherein a fourth embodiment of the present invention is shown, the ceramic body 10 includes four ceramic elements 13, 14, 15 and 16 and three interior electrodes 64, 65 and 66 embedded therein in a similar fashion as hereinbefore described. However, it is to be noted that each two of the ceramic elements, as indicated by 13 and 14 or 15 and 16 are of the same thickness, but the thickness differs between each ceramic element 13 or 14 and each ceramic element 15 or 16. One of the interior electrodes, as indicated by 64, is sandwiched between the ceramic elements 15 and 16 while the remaining interior electrodes 63 and 65 are respectively sandwiched between the ceramic elements 13 and 15 and between the ceramic elements 14 and 16.

This fourth embodiment has been developed in view of the fact that, if the interior electrodes are positioned close to the corresponding exterior electrodes, reduction of the uneven potential distribution can be remarkable. Accordingly, only the electrodes 63 and 65 which are positioned close to the corresponding electrodes 20 and 30 act to reduce the uneven potential distribution occurring in the proximity of the perihery of each of the exterior electrodes 20 and 30 while the remaining interior electrode 64 does not significantly contribute to such a reduction.

In this embodiment, the unevenness of the potential distribution in the proximity of the periphery of each of the exterior electrodes 20 and 30 susceptible to dielectric breakdown can be made uniform by positioning the interior electrodes 63 and 65 close to the corresponding exterior electrodes 20 and 30, thereby reducing the concentration of the uneven potential distribution so that the breakdown voltage characteristic can be improved. However, it is to be noted that, even in this embodiment, since the interior electrodes 63, 64 and 65 are rigidly embedded in the ceramic body 10 having a high dielectric constant, the uneven potential distribution occurring in the proximity of the periphery of each of the exterior electrodes 20 and 30 can be advantageously reduced as well as in the foregoing embodiments.

Figure 6:
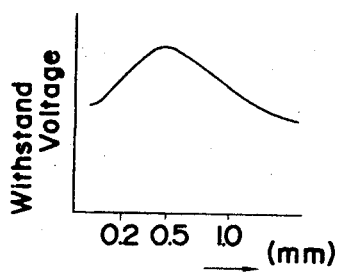
FIG. 6 is particularly related to the capacitor assembly shown in FIG. 5, showing the relationship between the breakdown voltage and the space from the outermost periphery of each of the interior electrodes to the outermost peripheral surface of the capacitor assembly.

In constructing the laminated ceramic capacitor assembly in accordance with the fourth preferred embodiment, care must be taken in that the space between the periphery of each of the electrodes 63 and 65 which are adjacent to the corresponding exterior electrodes 20 and 30 to the outermost peripheral surface of the ceramic body 10 is within the range of 0.2 to 1.0 millimeters, preferably, 0.5 mm for the reason shown in the graph of FIG. 6. If the space is smaller than the smallest limit of 0.2 mm., manufacture of the assembly will be complicated as well as almost no improvement being apparent in the breakdown voltage characteristic while, if the space exceeds the greatest limit of 1.0 mm., no favorable reduction of the uneven potential distribution can be achieved without any improvement in the breakdown voltage characteristic.

Figure 7:
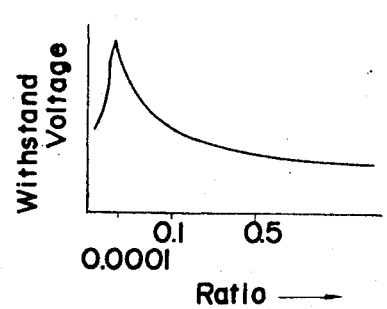
FIG. 7 is particularly related to the capacitor assembly shown in FIG. 5, showing the relationship between the breakdown voltage and the positioning of each of the interior electrodes with respect to the corresponding one of the exterior electrodes.

In addition, care must be also taken in that the ratio of the distance between the interior electrode 63 or 65 and the exterior electrode 20 or 30 relative to the distance between the interior electrode 64 and either of the exterior electrodes 20 and 30 is preferably smaller than 0.5 as shown in the graph of FIG. 7. In this ratio exceeds the preferred maximum value, no substantial improvement in the breakdown voltage characteristic will be appreciated.

In any event, an average value of the breakdown voltages of 20 samples of the laminated capacitor assembly of the construction shown in FIG. 5, wherein the ratio is approximately 0.0001 while the space is approximately 0.5 mm., was found to be 33.4 KV DC which is more than two or three times of that of a conventional capacitor.

However, it is to be noted that, in this fourth embodiment, the electrode 64, which is positioned between the other electrodes 63 and 65, may be omitted.

In either case, the uneven potential distribution within the ceramic body 10 can be reduced and the concentration thereof in the proximity of the periphery of each of the exterior electrodes 20 and 30 can be also reduced.

Figure 8:
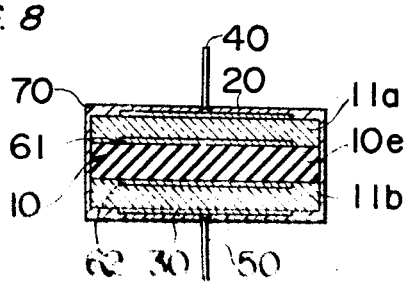
FIG. 8 is a longitudinal cross-section of a still further embodiment of the capacitor assembly of the present invention.

The embodiment shown in FIG. 8 is similar in construction to the embodiment shown in FIG. 4(a). However, the ceramic elements 11a and 11b shown in FIG. 8 is made of glaze material. As is well known, glaze material has a strong affinity with respect to ceramic material and the dielectric constant is as high as that of ceramic material. In addition thereto, glaze material can be fired at a relatively low temperature.

Accordingly, the electrodes 61 and 62 can be rigidly sandwiched between the ceramic element 10e and each of the ceramic elements 11a and 12a and, thus, rigidly embedded in the ceramic body 10.

In the laminated capacitor assembly of the construction as shown in FIG. 8, not only can the several features as hereinbefore described in connection with the foregoing embodiments be appreciable, but also an additional feature in that silver or the like which has a relatively low firing temperature can be used as material for the various electrodes. In other words, during manufacturing, the first firing process can be executed at a temperature relatively lower than required during the same process, subject to the capacitor assembly having the interior electrodes made of Pt, Pd, or a mixture for thermistors, varistors and ferrites or the like. Furthermore, the use of Pt, Pd or a mixture for interior electrodes which are relatively expensive may be avoided and, therefore, a reduction of the manufacturing cost realized.

It is to be noted that the thickness of each of the ceramic elements 11a and 11b is preferably within the range of from a few microns to 100 microns. The glaze material for the ceramic elements 11a and 11b may be one of borosilicate glass and sodium glass.

According to experiments, an average value of the breakdown voltages of each 20 samples listed below of the laminated capacitor assembly of the fifth embodiment and a conventional capacitor were as set forth in the following table:

| | Breakdown Voltage |
|---|---|
| Embodiment of FIG. 8 having ceramic elements 11a and 11b made of glaze material of 100 microns in thickness and a dielectric constant of 1000. | 31.8 KV DC |
| Conventional Sample having the periphery of each of the exterior electrodes coated with enamel painting agent. | 13.3 KV DC |
| Conventional Sample with no interior electrodes embedded. | 12.5 KV DC |

From the foregoing table, it is clear that the breakdown voltage characteristic of the laminated ceramic capacitor assembly according to the fifth embodiment of the present invention is in fact improved.

In any event, even in this fifth embodiment of the present invention, the glaze material having a dielectric constant higher than the ceramic element 10e may be employed as a material for the ceramic elements 11a and 11b, In this case, in a manner similar to the embodiment of FIG. 4(a), the breakdown voltage characteristic can be somewhat improved more than in the case where the ceramic elements 10e, 11a and 11b have the same dielectric constant.

Thus, according to the present invention, there is provided a laminated ceramic capacitor assembly of compact size having an improved breakdown voltage characteristic which is achieved by embedding a plurality of interior electrodes in the ceramic body, thereby permitting an uneven potential distribution to be reduced or substantially eliminated.

However, in any one of the foregoing embodiments, semiconductor material such as the known mixtures used in thermistors, varistors, and ferrites may be employed in place of expensive metallic materials such as Pt, Ag and Pd for the interior electrodes.

In fact, when the interior electrodes were all prepared with the semi-conductor material in connection with, for example, the embodiment of FIG. 2, the following results were obtained:

| Type of Body 10 | Material & Number of Interior Electrodes | Thickness (mm.) | Diameter (mm.) | Breakdown Voltage |
| --- | --- | --- | --- | --- |
| 90% BaTiO$_3$ & 10% CaZnO$_3$ | Not provided | 3 | 20 | 14 KV |
| " | MaO-CoO-CuO (6) | 3 | 20 | 32 KV |
| 37 | Mn·Zn ferrite (6) | 3 | 20 | 31 KV |
| TiO$_2$ | Not provided | 3 | 20 | 24 KV |
| " | MnO-CoO-CuO (6) | 3 | 20 | 53 KV |
| " | Mn·Zn ferrite (6) | 3 | 20 | 51 KV |

Accordingly, it is clear that the use of the semiconductor material for the interior electrodes in the ceramic body results in not only a reduction in manufacturing cost, but also an improvement in the breakdown voltage characteristic. In this connection, semiconductor material used should be in a form which has been crystallized.

Although the present invention has been fully described by way of example in connection with the preferred embodiments thereof with reference to the accompanying drawings, it is to be noted that these are only for the purpose of illustration thereof and, therefore, the present invention is not to be limited thereby. Furthermore, various changes and modifications of the present invention as are apparent to those skilled in the art are to be construed as included within the scope of the present invention unless otherwise departing clearly therefrom.

What we claim is:

1. A high voltage capacitor assembly comprising:
a single ceramic body formed of a plurality of ceramic elements;
a pair of exterior electrodes disposed on both end faces of said ceramic body; and
at least one interior electrode embedded in said ceramic body with its periphery unexposed to the outside of said ceramic body and being sealedly sandwiched between two of said ceramic elements which are in parallel and in spaced relation with respect to each other and are in parallel and respectively positioned relatively close to each of said exterior electrodes, said periphery spaced from the outermost peripheral surface of said ceramic body by a distance of a value within a range of from 0.2 to 1.0 mm.

2. A high voltage capacitor assembly as claimed in claim 1, wherein said exterior electrodes are provided with external lead wires extending therefrom for external connection with an external circuit element, and said capacitor assembly further comprises an insulator covering applied on the whole surfaces of said ceramic body including said exterior electrodes with said lead wires extending therethrough to the outside of said covering.

3. A high voltage capacitor assembly as claimed in claim 1, whrein said at least one interior electrode includes two interior electrodes.

4. A high voltage capacitor assembly as claimed in claim 1, wherein said end faces of said ceramic body are recessed to form respectively shaped rounded recesses and said exterior electrodes are correspondingly recessed to fit into the respective recesses of said end faces.

5. A high voltage capacitor assembly as claimed in claim 1, wherein said interior electrodes are each made of semiconductor material.

6. A high voltage capacitor assembly comprising:
a single ceramic body formed with at least three ceramic elements;
a pair of exterior electrodes disposed on both end faces of said ceramic body and each including a lead wire connected therewith for external connection with an external circuit element;
at least two interior electrodes each embedded in said ceramic body and sealedly sandwiched between one of said ceramic elements and its adjacent ceramic element in parallel and in spaced relation with respect to each other and with respect to each of said exterior electrodes; and
an insulator covering applied on the whole surface of said ceramic body including the exterior electrodes with said lead wires extended therethrough to the outside of said covering, wherein said at least two interior electrodes are respectively positioned relatively close to said exterior electrodes, and have their periphery spaced from the outermost peripheral surrace of said ceramic body by a distance of a value within the range of from 0.2 to 1.0 mm.

7. A high voltage capacitor assembly as claimed in claim 6, wherein each of two of said plurality of said ceramic elements, which are respectively positioned relatively close to said exterior electrodes, is positioned such that the ratio of the distance between one of the exterior electrodes and a third ceramic element of said plurality to the distance between said one of the exterior electrodes and a fourth of said ceramic elements of said plurality; said third and fourth ceramic elements sandwiching a centrally located interior electrode therebetween and being positioned between said two ceramic elements, is less than 0.5.

8. A high voltage capacitor assembly as claimed in claim 6, wherein two of said ceramic elements which are respectively in contact with the exterior electrodes are each made of ceramic material having a dielectric constant higher than that of a remaining one of said ceramic elements.

9. A high voltage capacitor assembly as claimed in claim 7, wherein said two ceramic elements are each made of glaze material.

10. A high voltage capacitor assembly as claimed in claim 6, wherein two of said ceramic elements which are respectively in contact with the exterior electrodes are each made of glaze material.

11. A high voltage capacitor assembly comprising:
a plurality of substantially disc-shaped ceramic elements;
a plurality interior disc-shaped electrodes, each respective one of which is disposed between a pair of said plurality of ceramic elements, the diameter of said electrodes being less than the diameter of said ceramic element; and
a pair of external electrodes disposed on the opposite surfaces of respective ones of the pair of ceramic elements of said plurality of elements between which the remainder of said plurality of elements and plurality of interior electrodes are disposed, wherein each respective one of said plurality of interior disc-shaped electrodes are respectively positioned relatively close to respective ones of said pair of external electrodes, and have their periphery spaced from the outermost peripheral surface of respective ones of the pair of ceramic elements by a distance of a value within the range of from 0.2 to 1.0 mm.

12. A high voltage capacitor assembly according to claim 11, wherein the number of ceramic elements is even, and one of said interior electrodes is centrally confined between said external electrodes.

13. A high voltage capacitor assembly according to claim 11, wherein the number of ceramic elements is odd, and one of said ceramic elements is centrally confined between said external electrodes.

14. A high voltage capacitor assembly according to claim 13, wherein the dielectric constant of said centrally confined ceramic element is lower than the dielectric constants of the remaining ceramic elements.

15. A high voltage capacitor assembly according to claim 11, wherein said interior electrodes are made of crystallized semiconductor material.

16. A high voltage capacitor assembly according to claim 14, wherein said remaining ceramic elements are made of a material selected from the group consisting of borosilicate glass and sodium glass.

17. A high voltage capacitor assembly according to claim 11, wherein said exterior electrodes are provided with external lead wires, and said assembly further includes an insulator coating applied on the entirety thereof, with said external lead wires extending through said coating.

18. A high voltage capacitor assembly according to claim 11, wherein the thickness of each of said ceramic elements, at the periphery thereof, is substantially the same.

19. A high voltage capacitor assembly according to claim 11, wherein the thickness of each of the ceramic elements of said pair is less than the thickness of each of said remaining ceramic elements.

20. A high voltage capacitor assembly according to claim 11, wherein the difference in the diameters of said ceramic elements and said interior electrodes is between 0.2 to 1.0 millimeters.

21. A high voltage capacitor assembly according to claim 20, where said difference is substantially 0.5 mm.

22. A high voltage capacitor assembly according to claim 19, wherein the thickness of each ceramic element of said pair is approximately 0.0001 of the thickness of each of said remaining ceramic elements.

23. A method of manufacturing a high voltage capacitor assembly, comprising the steps of:
laminating, to form a ceramic body, a plurality of ceramic elements while sandwiching respective interior electrodes between each two of said ceramic elements;
firing said ceramic body thus formed at a suitable temperature;
applying a pair of exterior electrodes on both end faces of said ceramic body;
firing said ceramic body, provided with said exterior electrodes, at a temperature somewhat lower than said first mentioned temperature and the firing temperature of material used for said exterior electrodes;
soldering a pair of lead wires to said exterior electrodes, respectively; and
coating an insulator material over the whole surface of said ceramic body to form an insulator covering thereover.

* * * * *